United States Patent
Danjo et al.

(10) Patent No.: US 7,147,195 B2
(45) Date of Patent: Dec. 12, 2006

(54) AUTOMOBILE SLIDE ADJUSTER

(75) Inventors: Yasuharu Danjo, Aki-gun (JP); Yasuo Izumi, Aki-gun (JP)

(73) Assignee: Delta Kogyo Co., Ltd, Hiroshima (JP)

( * ) Notice: Subject to any disclaimer, the term of this patent is extended or adjusted under 35 U.S.C. 154(b) by 94 days.

(21) Appl. No.: 10/941,862

(22) Filed: Sep. 16, 2004

(65) Prior Publication Data

US 2005/0056761 A1 Mar. 17, 2005

(30) Foreign Application Priority Data

Sep. 17, 2003 (JP) ............................. 2003-324957

(51) Int. Cl.
*F16M 13/00* (2006.01)

(52) U.S. Cl. ...................................... 248/430

(58) Field of Classification Search ................ 248/424, 248/429, 430; 297/344.1, 341, 331
See application file for complete search history.

(56) References Cited

U.S. PATENT DOCUMENTS

| | | | |
|---|---|---|---|
| 3,759,587 A * | 9/1973 | Christin ........................ 384/47 |
| 4,756,503 A * | 7/1988 | Fujita ........................... 248/430 |
| 5,222,814 A * | 6/1993 | Boelryk ........................ 384/47 |
| 5,529,397 A | 6/1996 | Yoshida |
| 5,755,421 A * | 5/1998 | Meier et al. ................. 248/429 |
| 5,897,091 A * | 4/1999 | Hayakawa et al. ......... 248/430 |
| 6,416,130 B1 * | 7/2002 | Yamada et al. ........ 297/344.11 |
| 6,497,397 B1 * | 12/2002 | Fujimoto et al. ........... 248/430 |
| 6,742,753 B1 * | 6/2004 | Klahold et al. ............. 248/429 |
| 6,860,538 B1 * | 3/2005 | Muller et al. ............ 296/65.13 |
| 2002/0008183 A1* | 1/2002 | Mallard et al. ............. 248/429 |
| 2002/0036254 A1* | 3/2002 | Eguchi et al. .............. 248/429 |
| 2002/0179800 A1* | 12/2002 | Flick ........................... 248/429 |
| 2003/0168567 A1* | 9/2003 | Klahold et al. ............. 248/429 |

FOREIGN PATENT DOCUMENTS

| | | |
|---|---|---|
| JP | 58-48536 | 4/1983 |
| JP | 58-60533 | 4/1983 |
| JP | 62-79628 | 5/1987 |
| JP | 5-7532 | 2/1993 |
| JP | 5-37554 | 5/1993 |
| JP | 7-266943 | 10/1995 |
| JP | 7-329616 | 12/1995 |

* cited by examiner

*Primary Examiner*—Korie Chan
(74) *Attorney, Agent, or Firm*—Wenderoth, Lind & Ponack, L.L.P.

(57) ABSTRACT

An automobile slide adjuster includes a lower rail to be secured to a vehicle body and an upper rail slidably mounted on the lower rail. A plurality of rolling elements are disposed between the upper and lower rails at a lower portion thereof. The upper rail has a plurality of upward protrusions formed on an upper portion thereof and also has an elongated opening formed along a lower edge of each of the plurality of upward protrusions. The upward protrusions are held in sliding contact with a portion of the lower rail.

7 Claims, 7 Drawing Sheets

AUTOMOBILE SLIDE ADJUSTER

BACKGROUND OF THE INVENTION

1. Field of the Invention

The present invention relates to a slide adjuster for use in adjusting the position of an automobile seat in a longitudinal direction of a vehicle body.

2. Description of the Related Art

Automobile slide adjusters generally include a lower rail and an upper rail mounted thereon so as to be slidable relative thereto. Some conventional automobile slide adjusters include a plurality of rolling elements such as, for example, rollers, balls, or the like interposed between the lower rail and the upper rail to reduce the sliding resistance (see Document 1). Some conventional automobile slide adjusters include a plurality of elastic elements made of, for example, a resin interposed between the lower rail and the upper rail to eliminate clearances between the lower rail and the upper rail (see Document 2 or 3). Furthermore, some conventional automobile slide adjusters include a plurality of projections formed on the lower rail or the upper rail to eliminate vertical and horizontal looseness (see Document 4, 5 or 6).

Document 1: Japanese Laid-Open Patent Publication No. 7-266943

Document 2: Japanese Laid-Open Utility Model Publication No. 5-7532

Document 3: Japanese Laid-Open Utility Model Publication No. 5-37554

Document 4: Japanese Laid-Open Utility Model Publication No. 62-79628

Document 5: Japanese Laid-Open Utility Model Publication No. 58-40533

Document 6: Japanese Laid-Open Utility Model Publication No. 58-48536

The slide adjuster as disclosed in Document 1 is of a construction in which both the upper and lower rails have ribs formed on surfaces thereof that are opposed to each other and held in contact with the rolling elements so that the ribs may absorb variations in the interval between the opposing surfaces. Accordingly, this slide adjuster requires many component parts and a lot of time for the manufacture thereof.

In the slide adjuster as disclosed in Document 2 or 3, the elastic elements act to reduce the sliding resistance to thereby eliminate generation of noises. However, the provision of the elastic elements results in an increase in the number of component parts and requires a time-consuming assemblage.

In the slide adjuster as disclosed in Document 4, 5 or 6, vertical and horizontal looseness is eliminated by the projections formed on the lower rail or the upper rail, but this slide adjuster involves a problem in that the sliding resistance cannot be readily stabilized due to variations in the size of the upper or lower rail. Furthermore, a high dimensional accuracy is required, resulting in a reduction in productivity.

SUMMARY OF THE INVENTION

The present invention has been developed to overcome the above-described disadvantages.

It is accordingly an objective of the present invention to provide a highly reliable automobile slide adjuster of a simple construction, which is capable of reducing the number of component parts or the assembling work and in which the sliding resistance is stabilized.

In accomplishing the above and other objectives, the automobile slide adjuster according to the present invention includes a lower rail to be secured to a vehicle body, an upper rail slidably mounted on the lower rail, and a plurality of rolling elements disposed between the upper and lower rails at a lower portion thereof. The upper rail has a plurality of upward protrusions formed on an upper portion thereof and also has an elongated opening formed along a lower edge of each of the plurality of upward protrusions. The upward protrusions are held in sliding contact with a portion of the lower rail.

A vertical distance between centers of the rolling elements and tops of the upward protrusions is set to be greater than or equal to a vertical distance between the centers of the rolling elements and the portion of the lower rail.

The lower rail has an upper wall, while the upper rail has an inner side wall, an outer side wall, and an outwardly extending wall extending outwardly from an upper edge of the outer side wall, wherein the upward protrusions are formed on the outwardly extending wall of the upper rail and held in sliding contact with an inner surface of the upper wall of the lower rail.

The upper rail has an inclined lower wall formed between the inner and outer side walls, and the rolling elements are held in contact with the inclined lower wall.

The above-described construction requires no rolling elements at an upper portion of the upper and lower ails, making it possible to reduce the number of component parts and the assembling work. Furthermore, the elongated opening formed along the lower edge of each upward protrusion provides the upward protrusion with vertical elasticity. Accordingly, even if dimensional variations of the lower rail or the upper rail exist, the vertical elasticity of the upward protrusion can absorb such dimensional variations and, hence, the sliding resistance is stabilized and the productivity is enhanced.

Also, the upper portion of the lower rail is partially held in sliding contact with the upper portion of the upper rail via only the upward protrusions, making it possible to further stabilize the sliding resistance and provide a highly reliable automobile slide adjuster of a simple construction.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENT

This application is based on an application No. 2003-324957 filed Sep. 17, 2003 in Japan, the content of which is herein expressly incorporated by reference in its entirety.

Figure 1:
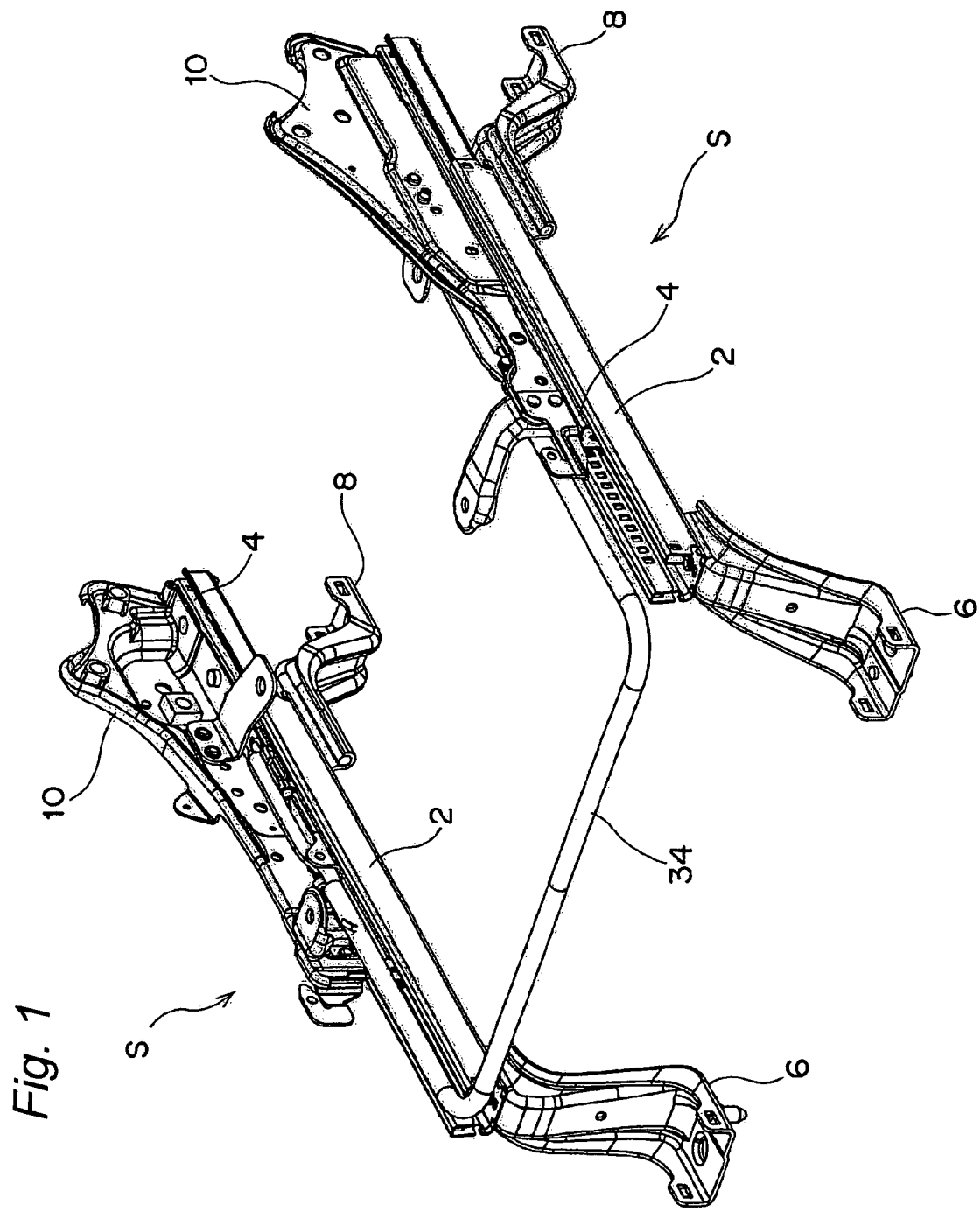
FIG. 1 is a perspective view of automobile slide adjusters according to the present invention.

Referring now to the drawings, there is shown in FIG. 1 an automobile slide adjuster S embodying the present invention, which is disposed on each side of a seat (not shown) for use in adjusting the position of the seat in the longitudinal direction of a vehicle body. Because the pair of slide adjusters S are symmetric with respect to the longitudinal centerline of the seat, only one of them that is positioned on the right-hand side as viewed from a seat occupant is explained hereinafter.

Figure 2:
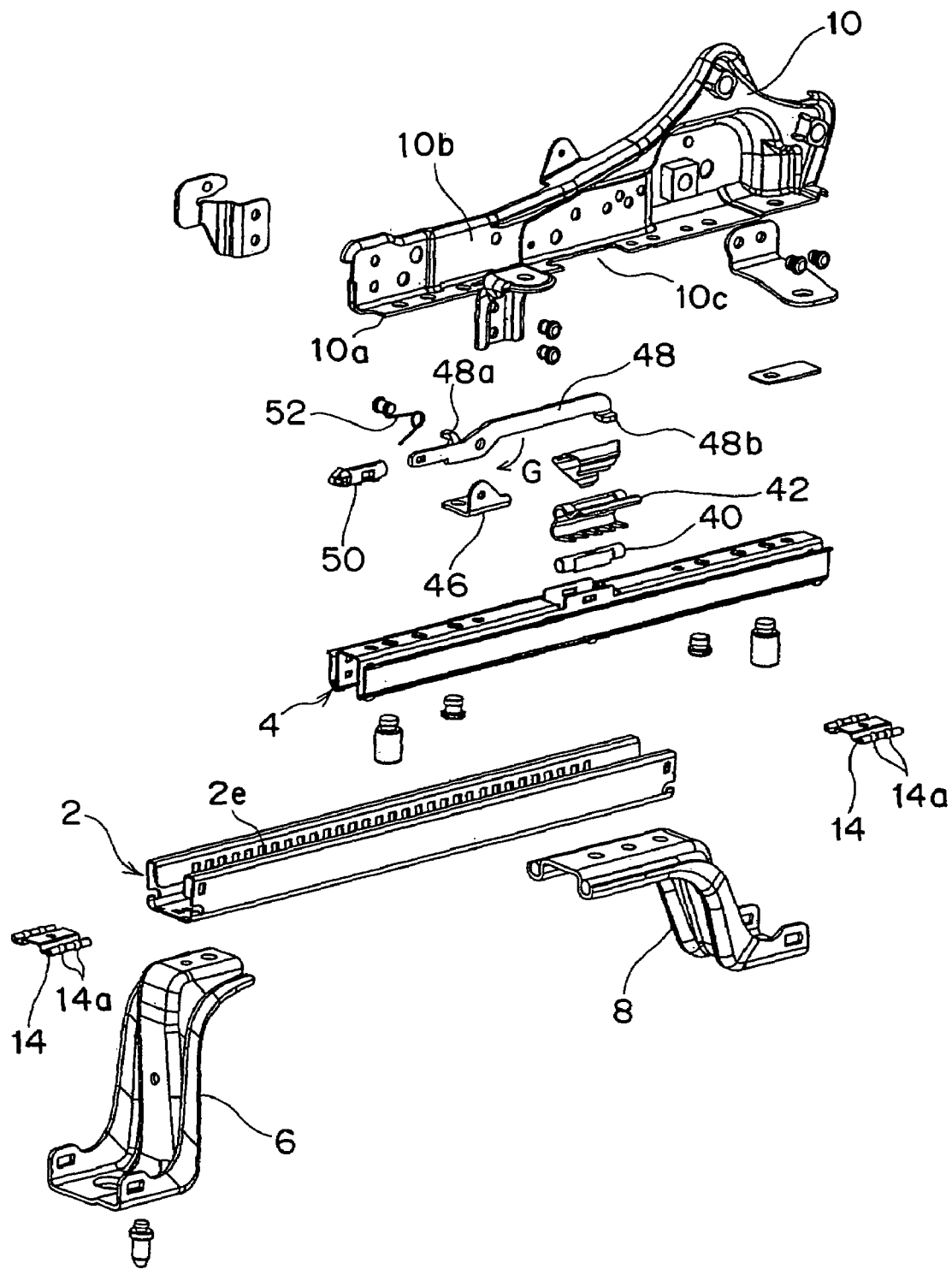
FIG. 2 is an exploded perspective view of one of the automobile slide adjusters of FIG. 1.

As shown in FIGS. 1 and 2, the automobile slide adjuster S includes a lower rail 2 and an upper rail 4 mounted thereon so as to be slidable relative thereto in the longitudinal direction thereof. The lower rail 2 is rigidly secured to a vehicle floor via front and rear brackets 6, 8, while a side frame 10 forming a seat cushion frame is rigidly secured to the upper frame 4.

Figure 3:
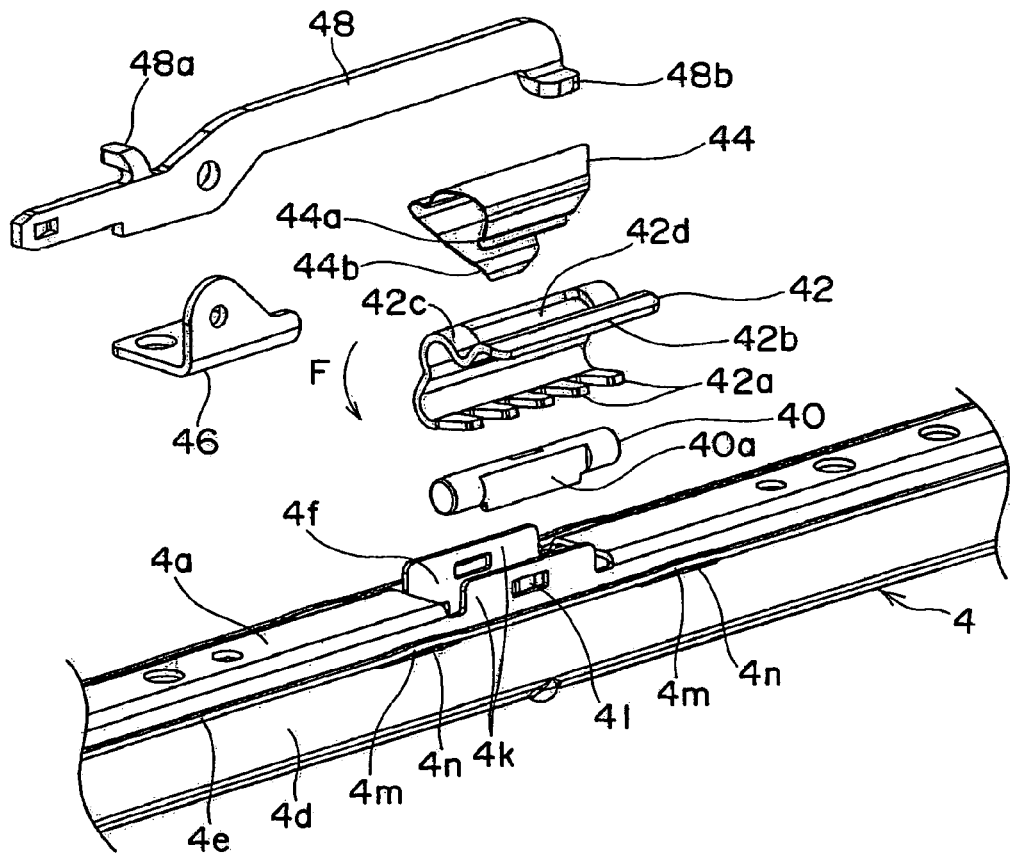
FIG. 3 is an exploded perspective view of a portion of the automobile slide adjuster of FIG. 2.
Figure 4:
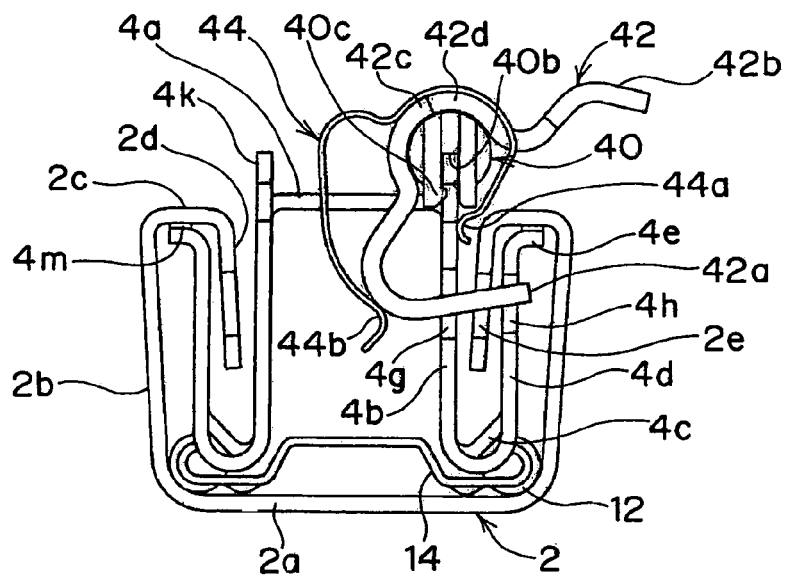
FIG. 4 is a vertical sectional view of the automobile slide adjuster of FIG. 2, particularly depicting a condition in which an upper rail is locked with respect to a lower rail by a lock mechanism.

As shown in FIGS. 2 to 4, the lower rail 2 has a cross section generally in the form of a figure "U" and includes a bottom wall 2a, two outer side walls 2b extending upwardly from respective side edges of the bottom wall 2a, two upper walls 2c extending horizontally inwardly from upper edges of the two outer side walls 2b, respectively, and two inner side walls 2d extending downwardly from inner edges of the two upper walls 2c, respectively. Each of the inner side walls 2d has a number of rectangular lock holes 2e defined therein at regular intervals.

The upper rail 4 has a cross section generally in the form of an inverted "U" and includes an upper wall 4a, two inner side walls 4b extending downwardly from respective side edges of the upper wall 4a, two inclined lower walls 4c outwardly and obliquely upwardly from lower edges of the two inner side walls 4b, respectively, two outer side walls 4d extending upwardly from outer edges of the two inclined lower walls 4c, respectively, and two outwardly extending walls 4e extending horizontally outwardly from upper edges of the two outer side walls 4d, respectively.

Each of the outer side walls 2b of the lower rail 2 is located outside an associated one of the outer side walls 4d of the upper rail 4. Each of the upper walls 2c of the lower rail 2 is located above an associated one of the outwardly extending walls 4e of the upper rail 4. Each of the inner side walls 2d of the lower rail 2 is located between an associated one of the inner side walls 4b and an associated one of the outer side walls 4d of the upper rail 4.

Figure 5:
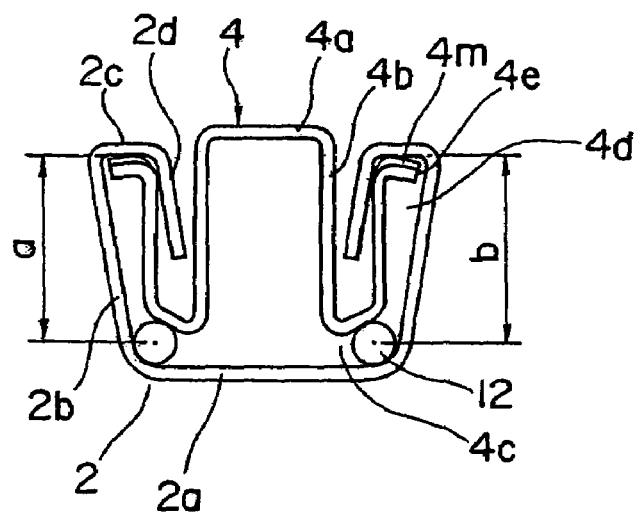
FIG. 5 is a vertical sectional view of the automobile slide adjuster of FIG. 2 for explaining the allowance setting of the upper and lower rails.

A retainer 14 for rotatably retaining a plurality of spherical elements (rolling elements) 12 is mounted on the bottom wall 2a of the lower rail 2 at each of front and rear end portions thereof. The retainer 14 has a cross section generally in the form of an inverted "U". The retainer 14 also has two recesses 14a defined therein at a predetermined interval on each side thereof, in each of which one of the spherical elements 12 is accommodated that is held in contact with the side edge of the bottom wall 2a of the lower rail 2 and with the incline lower wall 4c of the upper rail 4 so that the upper rail 4 may slide smoothly with respect to the lower rail 2 (see FIGS. 4 and 5).

In the automobile slide adjuster S according to the present invention, the allowance setting is made so as to satisfy a relationship a<b, where: "a" is the vertical distance between the center of the spherical element 12 and the inner surface (lower surface) of the upper wall 2c of the lower rail 2, and "b" is the vertical distance between the center of the spherical element 12 and the top of an upward protrusion (explained later) 4m formed on the outwardly extending wall 4e of the upper rail 4.

More specifically, the dimensional control of the slide adjuster is made based on the height of the upward protrusion 4m on the outwardly extending wall 4e of the upper rail 4 such that the size (b) of the upper rail 4 is greater than or equal to the size (a) of the lower rail 2. Furthermore, because an elongated opening 4n is formed along a lower edge of the upward protrusion 4m as explained later, the upward protrusion 4m acts to absorb variations in the size of the upper or lower rail 4, 2, making it possible to readily assemble them together without increasing the sliding resistance.

Figure 6:
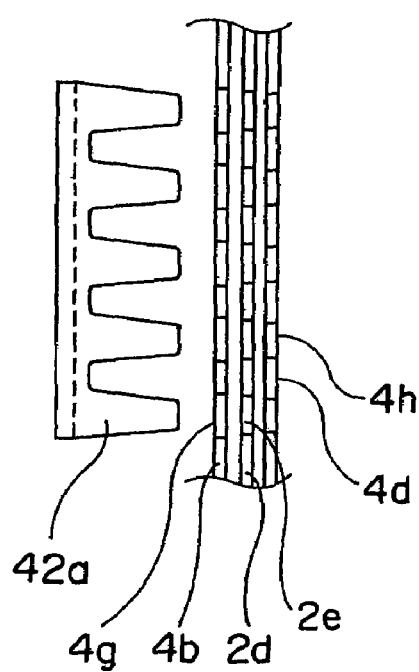
FIG. 6 is a bottom plan view, partly in section, of a lock member shown in FIG. 2 and the upper and lower rails, particularly depicting a relationship between lock pieces of the lock member and lock holes of the upper and lower rails.

The upper rail 4 has a generally rectangular lock member insertion hole 4f defined in the upper wall 4a substantially at the center in the longitudinal direction thereof, and a lock member (explained later) is inserted in the lock member insertion hole 4f. The upper rail 4 also has a plurality of (for example, five) generally rectangular lock holes 4g, 4h defined in each of the inner side wall 4b and the outer side wall 4d, which are both positioned on the center side of the seat, at a location in the proximity to the lock member insertion hole 4f in the upper wall 4a. As shown in FIG. 6, the width of the lock holes 2e in the lower rail 2 and that of the lock holes 4g, 4h in the upper rail 4 are determined in accordance with a tapered shape of lock pieces 42a of a lock member 42 such that the lock holes 4g in the inner side wall 4b of the upper rail 4, the lock holes 2e in the lower rail 2, and the lock holes 4h in the outer side wall 4d of the upper rail 4 become narrow in this order.

The upper rail 4 further has two lock member mounting portions 4k integrally formed therewith on respective sides of the lock member insertion hole 4f in the widthwise direction thereof by selectively cutting and raising a portion of the upper wall 4a so that the inner side walls 4b may extend upwardly to a predetermined level above the upper wall 4a. Each of the lock member mounting portions 4k has a generally rectangular engagement hole 4l defined therein.

A generally cylindrical support shaft 40 made of a resin is mounted on one of the lock member mounting portions 4k, and a lock member 42 is rotatably mounted on the support shaft 40 and is always biased in a direction of an arrow F by a plate spring 44. The support shaft 40 has two planar portions 40a formed on respective sides of an intermediate portion in the longitudinal direction thereof, and an insertion groove 40b, into which one of the lock member mounting portions 4k of the upper rail 4 is inserted, is formed between the two planar portions 40a. The width of the insertion groove 40b is so set as to be slightly smaller than that of the lock member mounting portions 4k of the upper rail 4. A retaining protrusion 40c is formed on one of two opposing inner side walls of the insertion groove 40b.

The lock member 42 has a curved cross section and a comb-shaped distal end (lower end) having a plurality of (for example, five) tapered lock pieces 42a. The lock pieces 42a protrude inwardly toward the center of the seat so as to be inserted into some of the lock holes 2e in the lower rail 2 and into the lock holes 4g, 4h in the upper rail 4 to lock the upper rail 4 with respect to the lower rail 2. The lock member 42 also has an engagement portion 42b formed at a proximal end (upper end) thereof so as to protrude inwardly toward the center of the seat. An operation rod (explained later) is engageable with the engagement portion 42b to operate the lock member 42. The lock member 42 further has an arcuated sliding portion 42c formed outwardly of the engagement portion 42b. The sliding portion 42c has an internal diameter nearly equal to an external diameter of the support shaft 40 so that the sliding portion 42c can be readily mounted on the support shaft 40. A rectangular opening 42d, into which one end (upper end) of the plate spring 44 is loosely inserted, is formed in a portion of the sliding portion 42c and in the vicinity thereof.

As is the case with the lock member 42, the plate spring 44 has a curved cross section. The plate spring 44 also has two contact portions 44a, 44b formed at opposite ends thereof, that are held in contact with the inner side wall 4b of the upper rail 4 and with proximal end portions of the lock pieces 42a of the lock member 42, respectively.

When the lock member 42 is mounted on the upper rail 4, the support shaft 40 is first fitted on the inside of the sliding portion 42c of the lock member 42, and the lock pieces 42a of the lock member 42 are subsequently inserted into some of the lock holes 2e in the lower rail 2 and into the lock holes 4g, 4h in the upper rail 4. Thereafter, the lock member mounting portion 4k of the upper rail 4 is press-fitted into the insertion groove 40b in the support shaft 40, and the retaining protrusion 40c formed on one of the inner side walls of the insertion groove 40b is engaged in the generally rectangular engagement hole 4l formed in the lock member mounting portion 4k of the upper rail 4. The plate spring 44 is then fitted on the lock member 42 in such a manner that one end of the plate spring 44 is loosely inserted into the rectangular opening 42d in the lock member 42, and the contact portion 44a formed at such end of the plate spring 44 is brought into contact with the inner side wall 4b of the upper rail 4, while the contact portion 44b formed at the other end of the plate spring 44 is brought into contact with the proximal end portions of the lock pieces 42a of the lock member 42, thereby always biasing the lock member 42 in the direction of the arrow F.

Alternatively, the lock member mounting portion 4k of the upper rail 4 may be first press-fitted into the insertion groove 40b in the support shaft 40, and the retaining protrusion 40c on the inner side wall of the insertion groove 40b is engaged in the generally rectangular engagement hole 4l in the lock member mounting portion 4k of the upper rail 4. In this case, the sliding portion 42c of the lock member 42 is subsequently fitted on the support shaft 40, and the lock pieces 42a of the lock member 42 are inserted into some of the lock holes 2e in the lower rail 2 and into the lock holes 4g, 4h in the upper rail 4.

The side frame 10 mounted on the upper rail 4 has a bottom wall 10a secured to the upper wall 4a of the upper rail 4 and a side wall 10b extending upwardly from the bottom wall 10a. The bottom wall 10a has a generally rectangular lock member insertion recess 10c defined in an intermediate portion in the longitudinal direction thereof, which communicates with the lock member insertion hole 4f formed in the upper rail 4. An L-shaped bracket 46 is secured to a front end of the side frame 10, and an operation rod 48 is hingedly connected at a central portion thereof to the bracket 46. A front end of the operation rod 48 is covered with a press-in piece 50, which is in turn press-fitted into one end of an operation pipe or member 34 as shown in FIG. 1 that is bent in the form of a figure "U". The operation rod 48 has a spring-holding protrusion 48a integrally formed therewith at a location rearwardly of the front end thereof, and one end of a spring 52 is held by the spring-holding protrusion 48a, while the other end of the spring 52 is held by the side frame 10, thereby always biasing the front end of the operation rod 48 downwardly. The operation rod 48 also has an inwardly bent pressure piece 48b integrally formed therewith at a rear end thereof, which is positioned above the engagement portion 42b of the lock member 42, so that the pressure piece 48b may engage with or disengage from the engagement portion 42b to lock or unlock the upper rail 4 with respect to the lower rail 2.

Figure 7:
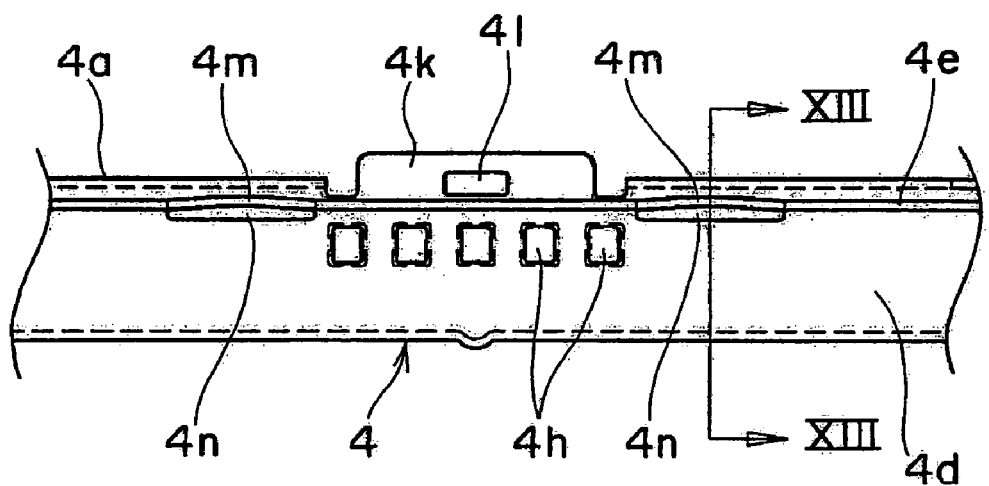
FIG. 7 is a side view of the upper rail, particularly depicting upward protrusions formed on the upper rail in front of and behind the lock holes.
Figure 8:
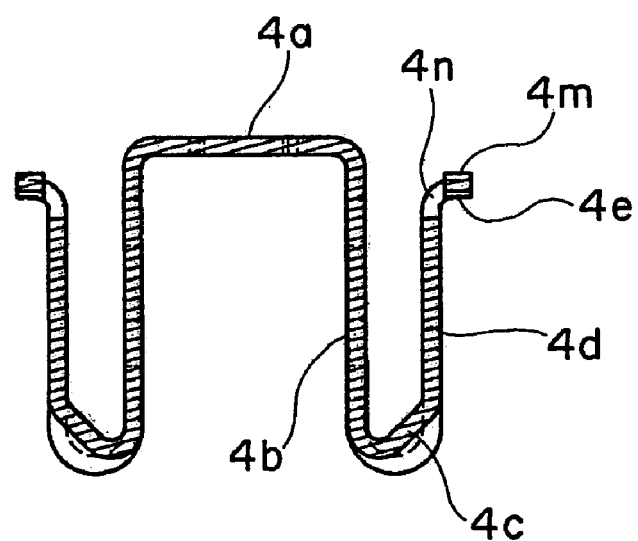
FIG. 8 is a sectional view taken along line XIII—XIII in FIG. 7.

As shown in FIGS. 7 and 8, the upper rail 4 has two upward protrusions 4m formed on each outwardly extending wall 4e in front of and behind the lock holes 4h at a predetermined interval. An elongated opening 4n extending along a lower edge of each upward protrusion 4m is formed in a curved portion between the outer side wall 4d and the outwardly extending wall 4e at a location adjoining the upward protrusion 4m. As illustrated in the drawings (see, for example, FIGS. 3 and 7), each upward protrusion 4m is unitarily formed with an upper portion of the upper rail 4 by first forming an elongated opening 4n of a predetermined length in the curved portion between the outer side wall 4d and the outwardly extending wall 4e at a location in front of or behind the lock holes 4h and by subsequently slightly lifting and curving a portion of the outwardly extending wall 4e that forms an upper edge of the elongated opening 4n.

Figure 9:
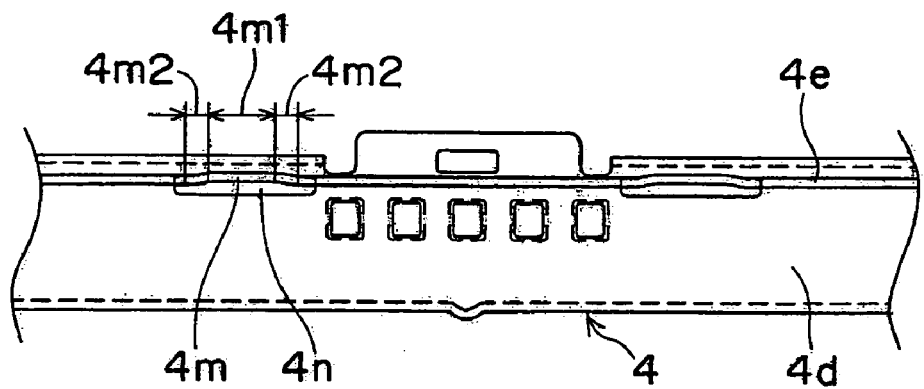
FIG. 9 is a view similar to FIG. 7, particularly depicting a modification thereof.
Figure 10:
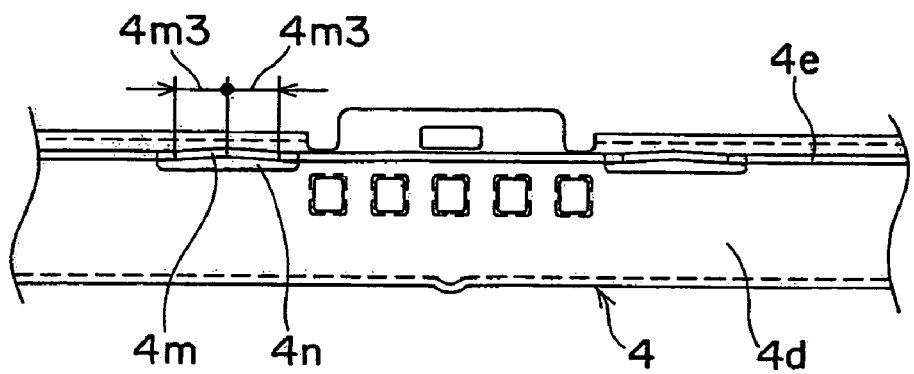
FIG. 10 is a view similar to FIG. 7, particularly depicting another modification thereof.
Figure 11:
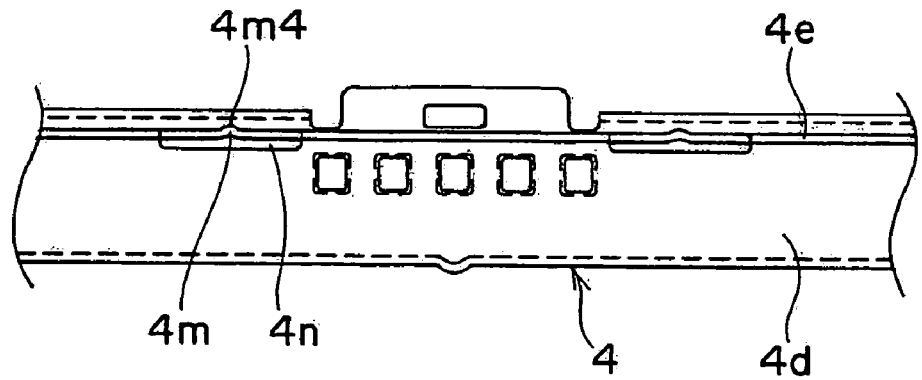
FIG. 11 is a view similar to FIG. 7, particularly depicting a further modification thereof.

FIGS. 9 to 11 depict several modifications of the upward protrusions 4m. Each upward protrusion 4m as shown in FIG. 9 has a flat portion 4m1 formed at the center thereof and two inclined portions 4m2 formed between the flat portion 4m1 and the outwardly extending wall 4e. Each upward protrusion 4m as shown in FIG. 10 is in the form of a sloping roof having a top where two inclined portions 4m3 meet. Each upward protrusion 4m as shown in FIG. 11 has a relatively small arcuated protrusion 4m4 formed at the center thereof.

The upper rail 4 may have no outwardly extending walls 4e. In this case, it is sufficient if the upward protrusions are formed on upper portions of the outer side walls 4d.

Figure 12:
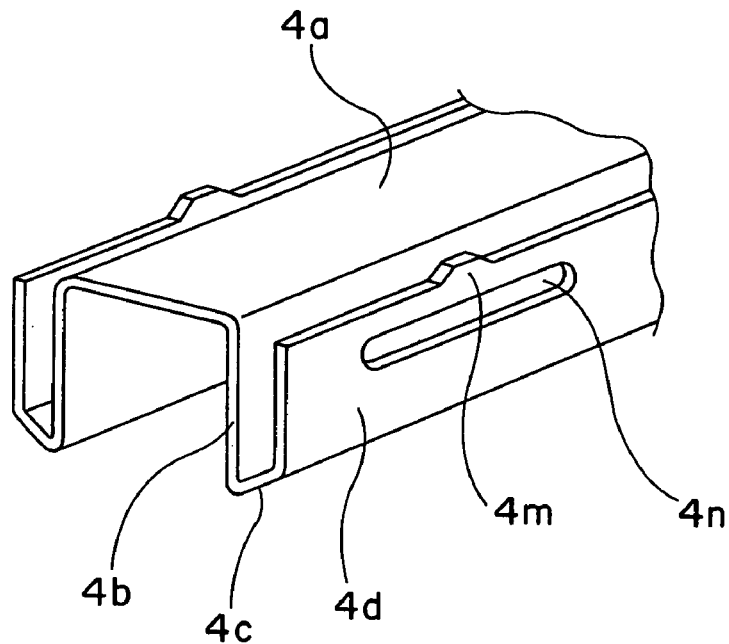
FIG. 12 is a perspective view of a portion of the upper rail, particularly depicting a still further modification of the upward protrusions.

FIG. 12 depicts the upward protrusions 4m formed on the upper portions of the outer side walls 4d in front of or behind the lock holes 4h. Each upward protrusion 4m is in the form of a trapezoid, and an elongated opening 4n is formed below the upward protrusion 4m.

Figure 13:
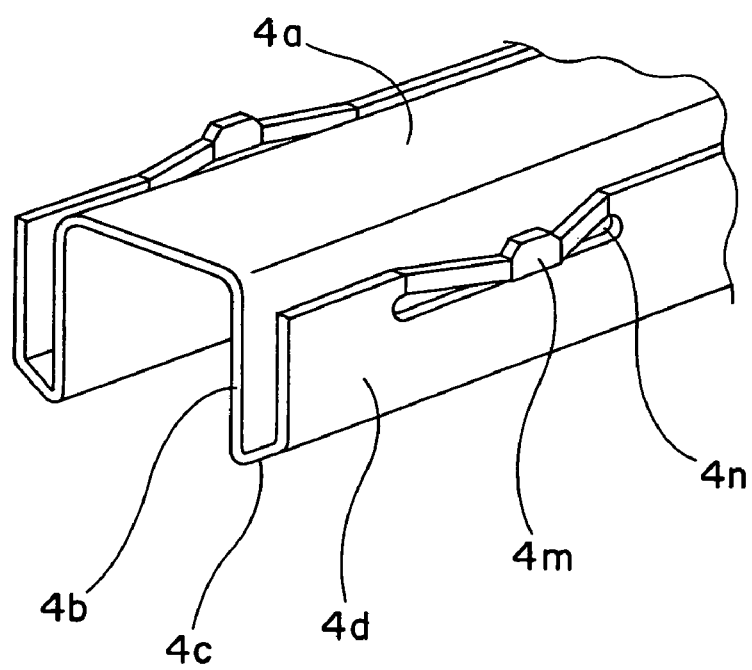
FIG. 13 is a view similar to FIG. 12, particularly depicting a modification thereof.

FIG. 13 depicts a modification of the upward protrusion 4m shown in FIG. 12. The modification as shown in FIG. 13 has two bent portions formed above opposite ends of the elongated opening 4n and two bent portions formed at front and rear ends of the trapezoidal upward protrusion 4m, which is extended outwardly and positioned between the outer side wall 2b and the inner side wall 2d of the lower rail 2.

The automobile slide adjuster S of the above-described construction operates as follows.

When the automobile is running, the lock pieces 42a of the lock member 42 biased by the plate spring 44 are retained in some of the lock holes 2e in the lower rail 2 and in the lock holes 4g, 4h in the upper rail 4 (see FIG. 4). Because the lock holes 4g in the upper rail 4, the lock holes 2e in the lower rail 2, and the lock holes 4h in the upper rail 4 become narrow in this order in accordance with the tapered shape of the lock pieces 42a, the upper rail 4 is securely locked on the lower rail 2 and, hence, the seat mounted on the upper rail 4 is held at a predetermined position.

When the automobile is not running and when the operation member 34 positioned below the front end of the seat is lifted to adjust the position of the seat, the operation rod 48 rotates in a direction of an arrow G, and the rear end thereof moves down. As a result, the engagement portion 42b of the lock member 42 is pressed down by the pressure piece 48b formed at the rear end of the operation rod 48 against the biasing force of the plate spring 44, thereby rotating the lock member 42 about the support shaft 40 in a direction counter to the direction of the arrow F. Accordingly, the lock pieces 42a of the lock member 42 are disengaged from the lock holes 2e in the lower rail 2 and the lock holes 4g, 4h in the upper rail 4, thereby releasing the lock of the upper rail 4 relative to the lower rail 2.

When a load is subsequently applied in the longitudinal direction of the seat, the upper rail 4 slides on the lower rail 2 via the spherical elements 12 rotatably retained in the retainers 14. When the operation member 34 is released at a desired position, the operation rod 48 rotates in a direction counter to the direction of the arrow G by the weight of the operation member 34 and, hence, the rear end of the operation rod 48 moves up. As a result, the lock member 42 is rotated in the direction of the arrow F by the biasing force of the plate spring 44, and the lock pieces 42a are again inserted into some of the lock holes 2e in the lower rail 2 and into the lock holes 4g, 4h in the upper rail 4. The upper rail 4 is thus locked with respect to the lower rail 2, and the seat is held at such desired position.

Because a plurality of (two on each side in this embodiment) upward protrusions 4m are formed on the outwardly extending walls 4e or the outer side walls 4d of the upper rail 4 and because only the upward protrusions 4m are held in sliding contact with the inner surfaces of the upper walls 2c of the lower rail 2, the sliding resistance is relatively small and the upper rail 4 slides smoothly along the lower rail 2. Furthermore, because the elongated openings 4n formed below the upward protrusions 4m provide the upward protrusions 4m with vertical elasticity, even if the manufacturing accuracy that has an influence on the sliding resistance of the upper rail 4 relative to the lower rail 2 is lowered to some extent due to, for example, dimensional variations of the lower rail 2 or the upper rail 4, it can be absorbed by the elasticity (flexibility) of the upward protrusions 4m.

It is to be noted here that although in the above-described embodiment two upward protrusions 4m are provided on each side of the upper rail 4 in the proximity to the central lock portion, they may be provided at other positions.

It is also to be noted that although in the above-described embodiment the lock member mounting portion 4k is formed on each side of the lock member insertion hole 4f, it may be formed on only one side of the lock member insertion hole 4f close to the center of the seat.

It is further to be noted that although in the above-described embodiment the spherical elements 12 are employed as the rolling elements to smoothly slide the upper rail 4 along the lower rail 2, sliding elements made of, for example, a resin may be employed in place of the rolling elements.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile slide adjuster comprising:
   a lower rail adapted to be secured to a vehicle body;
   an upper rail slidably mounted on said lower rail, said upper rail having a plurality of upward protrusions, said upward protrusions being unitarily formed with an upper portion of said upper rail, said upper rail also having an elongated opening extending through the upper rail and formed along a lower edge of each of said plurality of upward protrusions; and
   a plurality or rolling elements disposed between said upper and lower rails at a lower portion of said upper and lower rails,
   wherein said upward protrusions are held in sliding contact with a portion of said lower rail.

2. The automobile slide adjuster according to claim 1, wherein a vertical distance between centers of said rolling elements and tops of said upward protrusions is greater than or equal to a vertical distance between the centers of said rolling elements and said portion of said lower rail.

3. The automobile slide adjuster according to claim 1, wherein said lower rail has an upper wall, and said upper rail has an inner side wall, an outer side wall, and an outwardly extending wall extending outwardly from an upper edge of said outer side wall, and wherein said upward protrusions are formed on said outwardly extending wall of said upper rail and held in sliding contact with an inner surface of said upper wall of said lower rail.

4. The automobile slide adjuster according to claim 3, wherein said upper rail has an inclined lower wall formed between said inner and outer side walls, and said rolling elements are held in contact with said inclined lower wall.

5. The automobile slide adjuster according to claim 1, wherein said lower rail is shaped so as to include outer side walls and to define a lower rail interior between said outer side walls, at least a portion of said upper rail is disposed within said lower rail interior, and said upward protrusions further extend outwardly so as to project towards said outer side walls of said lower rail.

6. The automobile slide adjuster according to claim 1, wherein said upward protrusions further extend outwardly in a transverse direction of said lower rail.

7. The automobile slide adjuster according to claim 1, wherein said upward protrusions are elastically flexible in a vertical direction, so as to be operable to maintain sliding contact between said upper rail and said lower rail.

* * * * *